United States Patent [19]
Hwang et al.

[11] Patent Number: 6,155,329
[45] Date of Patent: Dec. 5, 2000

[54] SUNSHIELD AND METHOD FOR ATTACHING TO WINDOW

[76] Inventors: Charles Hwang, 1714 Stoner Ave., #9, Los Angeles, Calif. 90025; Michael Shyng, 1 Fl., No. 4, Alley 7, Lane 73, Sec. 5 Hsin-Hai Road, Taipei, Taiwan

[21] Appl. No.: 09/261,397

[22] Filed: Mar. 3, 1999

[51] Int. Cl.[7] .................................................. B60J 1/20
[52] U.S. Cl. ............................. 160/370.21; 160/370.23; 160/329; 160/DIG. 2; 296/97.7; 296/97.9
[58] Field of Search ................................. 160/107, 229, 160/329, 370.21, 370.23, DIG. 2; 296/97.7, 97.8, 97.9

[56] References Cited

U.S. PATENT DOCUMENTS

| | | |
|---|---|---|
| 2,223,477 | 12/1940 | Bernier .......................... 160/DIG. 2 X |
| 2,489,901 | 11/1949 | Kocinski ........................ 160/370.21 X |
| 2,599,066 | 6/1952 | Osborn . |
| 4,202,396 | 5/1980 | Levy . |
| 4,635,993 | 1/1987 | Hooper et al. . |
| 4,815,784 | 3/1989 | Zheng . |
| 4,862,943 | 9/1989 | Shafia .................................. 160/370.21 |
| 5,024,262 | 6/1991 | Huang . |
| 5,035,460 | 7/1991 | Huang . |
| 5,038,812 | 8/1991 | Norman . |
| 5,116,273 | 5/1992 | Chan . |
| 5,137,044 | 8/1992 | Brady . |
| 5,213,147 | 5/1993 | Zheng . |
| 5,333,634 | 8/1994 | Taylor . |
| 5,337,772 | 8/1994 | Habchi . |
| 5,339,851 | 8/1994 | Miller et al. . |
| 5,343,887 | 9/1994 | Danaher . |
| 5,356,191 | 10/1994 | Sheehan ......................... 160/370.21 X |
| 5,360,028 | 11/1994 | Jasin . |
| 5,378,518 | 1/1995 | Wang . |
| 5,411,046 | 5/1995 | Wan . |
| 5,421,355 | 6/1995 | Cantwell . |
| 5,439,017 | 8/1995 | Brown . |
| 5,452,934 | 9/1995 | Zheng . |
| 5,458,146 | 10/1995 | Gregg . |
| 5,467,794 | 11/1995 | Zheng . |
| 5,511,602 | 4/1996 | Choi et al. ......................... 160/370.21 |
| 5,546,971 | 8/1996 | Leonhardt . |
| 5,553,908 | 9/1996 | Shink . |
| 5,570,735 | 11/1996 | Chu .................................... 160/370.23 |
| 5,611,380 | 3/1997 | Landy . |
| 5,615,923 | 4/1997 | Madison ........................ 160/370.21 X |
| 5,628,357 | 5/1997 | Hwang . |
| 5,632,318 | 5/1997 | Wang . |
| 5,732,759 | 3/1998 | Wang ................................ 160/370.21 |
| 5,785,106 | 7/1998 | Hwang . |
| 5,941,265 | 8/1999 | Zheng ............................ 160/370.21 X |
| 5,992,498 | 11/1999 | Boston .............................. 160/370.22 |

*Primary Examiner*—Bruce A. Lev
*Attorney, Agent, or Firm*—Fulwider Patton Lee & Utecht, LLP

[57] ABSTRACT

A sheet of sunshield material is configured to approximate the shape of a window in which the sunshield will be placed. At least one hinge is attached to one or both sides of the sunshield and suction cups are provided in the hinges to removably attach the sunshield to a window.

9 Claims, 3 Drawing Sheets

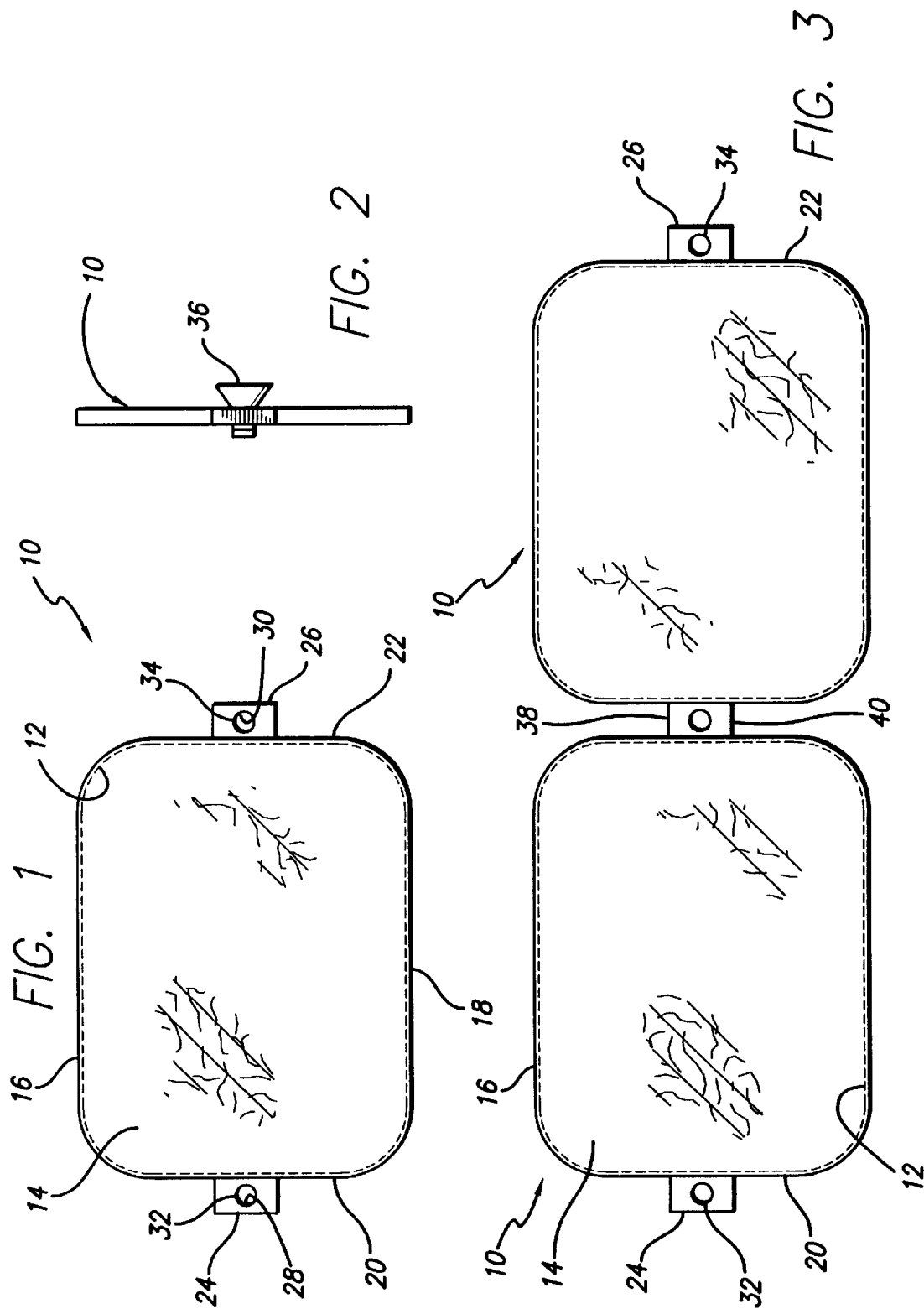

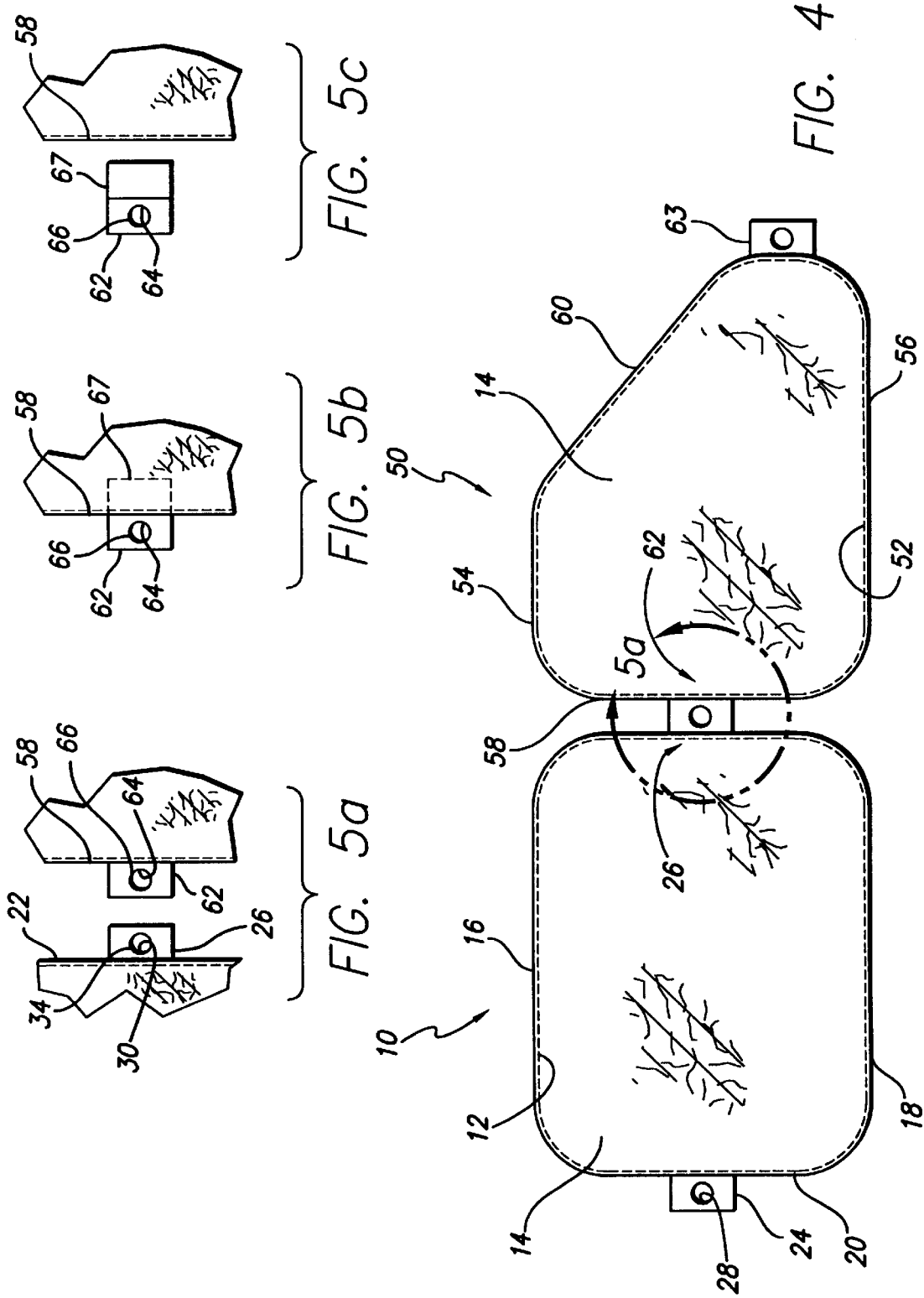

SUNSHIELD AND METHOD FOR ATTACHING TO WINDOW

BACKGROUND OF THE INVENTION

This invention relates to a sunshield, which may or may not be foldable, and the method of manufacturing the sunshield in which spring loops may be twisted to form a small configuration. Such sunshield is particularly useful in vehicles although it may also be used in homes, offices and other circumstances to reduce the amount of sun coming through windows.

The prior art discloses a folding automobile sunshield having two or more loops. The methods of manufacture, in the past, have included laying two spring steel loops, a spaced distance apart, on a single layer of sunshield material and attaching the spring steel loops to the material by rolling the edge of the material over the spring steel loops or otherwise attaching a tube to the material and enclosing the spring steel loops within such tube. The intermediate material occupying the distance between the two spring steel loops serves as a hinge between the two spring steel loops so that they may be folded one on top of the other. Then the two loops, and the entire sunshield, are twisted into a final, multiple loop, compact configuration substantially smaller than either loop of the sunshield. U.S. Pat. No. 4,815,784 entitled AUTOMOBILE SUNSHIELD illustrates such a method. Other prior art patents include U.S. Pat. No. 5,785,106 entitled SUNSHIELD AND METHOD OF MANUFACTURE OF SUNSHIELD.

What has been needed and heretofore unavailable is a sunshield that is custom fit to a window and is easily removably attached to a window. Further, more than one sunshield can be easily removably attached to the window to reduce sun glare.

SUMMARY OF THE INVENTION

In the preferred embodiment, a sheet of sunshield material is configured to approximate the shape of the window in which the sunshield will be placed. A conventional spring steel loop, or other similar conventional material, is attached to the sunshield material to approximate the shape of the window in which the sunshield will be placed. A hinge is attached to one or both sides of the sunshield and openings or apertures are placed in each of the hinges. A grommet or similar material can be used to secure the opening or aperture. A suction cup is removably attached to the grommet in order to mount the sunshield to a window.

The hinge on each side of the sunshield is preferably permanently attached either by sewing, gluing, stapling, metallic or non-metallic fasteners, or other equivalent means. It is envisioned that the hinge may be removably attached to the sunshield material such as by use of a VELCRO flap for the hinge material having a mating velcro material attached to the sunshield. Preferably, one or more hinges are attached to the sides of the sunshield, and depending upon the configuration, multiple hinges may be placed on each side or on the top or bottom of the sunshield.

Other features and advantages of the present invention will become more apparent from the following detailed description of the invention, when taken in conjunction with the accompanying exemplary drawings.

BRIEF DESCRIPTION OF THE DRAWINGS

FIG. 1 is a plan view of the sunshield depicting the side hinges.

FIG. 2 is a side view of the sunshield of FIG. 1 depicting suction cups protruding through the grommets in the hinge.

FIG. 3 is a plan view depicting two sunshields, having substantially identical configurations, with overlapping hinges between the two sunshields.

FIG. 4 depicts two sunshield having differing shapes and having overlapping hinges between the two sunshields.

FIG. 5a is an enlarged view of the hinges between the two sunshields of FIG. 4 before they are positioned into overlapping engagement.

FIG. 5b. is an enlarged partial view of the hinge flesibly attached with VELCRO to the sunshield of FIG. 4.

FIG. 5c. is an enlarged partial view of the hinge being removably attached.

DETAILED DESCRIPTION OF THE PREFERRED EMBODIMENTS

Figure 6:
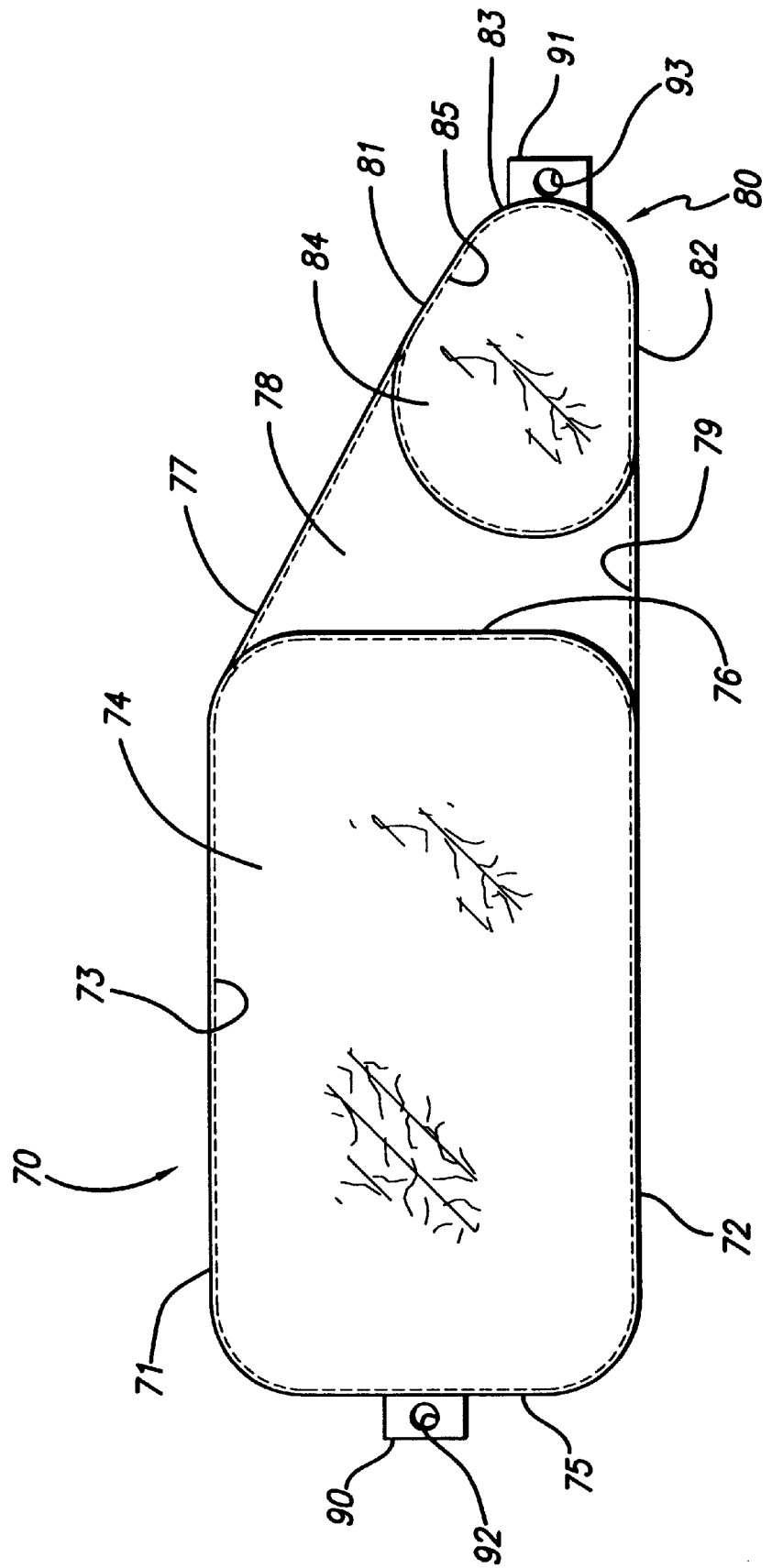
FIG. 6 is a plan view depicting two sunshields flexibly connected together showing attachment hinges.

The present invention provides protection from sun glare coming through a window, such as with a vehicle, office, or home window. Importantly, it is desirable to change the position of the sunshield on the window, or to provide a sunshield that has substantially the same dimensions as the window upon which it is temporarily mounted. Further, it is also desirable to have a sunshield that can be removed and reattached as desired. The present invention provides all of these advantages.

Turning to the drawing figures, and particularly FIGS. 1 and 2, sunshield 10 is provided in which spring loop 12 is attached to sunshield material 14. The method of attaching spring loop 12 to the sunshield material is well known and can include numerous configurations. Conventional sunshield material is used to screen the amount of light entering through the sunshield, but still permits visibility through the sunshield material.

In keeping with the invention, as depicted in FIGS. 1 and 2, sunshield 10 has top edge 16 and bottom edge 18 as well as side edges 20,22. A pair of hinges 24,26 are attached to side edges 20,22. Each hinge includes an aperture or opening 28,30, and preferably the opening is round. Each opening can be formed and secured by grommet 32,34 so that a suction cup 36 can be inserted through the grommet. Preferably, the hinges are flexibly connected to the side edges, and it is preferable that the hinges be made from a material which may include sunshield material or any other type of material that is sturdy enough to receive the suction cups and to hold the sunshield to a window surface. Alternatively, hinges 24,26 may be flexibly attached to side edges 20,22, yet the hinges be formed of a material that is substantially rigid that would permit a more secure attachment of the suction cup 36 through grommets 32,34.

Preferably, suction cup 36 or a similar device is inserted through opening 28,30 in the hinge, and more preferably through grommets 32,34 or a similar device. The suction cup should be sized to fit snugly through the grommets so that as the suction cup is pressed against a window surface, it will firmly hold sunshield 10 in position on the window. The hinges should be sized and have sufficient strength to firmly maintain the position of the sunshield even if air is blowing across the sunshield, for example, if the sunshield is on a window in a car and other windows in the car are open permitting air to flow over the sunshield.

While it is preferred that hinges 24,26 are attached to side edges 20,22, it is also contemplated that hinges may be attached to top edge 16 or bottom edge 18 (not shown).

Turning to FIG. 3, substantially identical sunshields 10 are placed side by side with hinges 38,40 overlapping to form a hinge between the two sunshields. In this configuration, a single suction cup 36 is positioned through the apertures in hinges 38 and 40 which overlap. Suction cups also are used to secure hinges 24 and 26 on the outside edges of the two sunshields. Thus, the two sunshields can be removably attached and mounted on the window in the event the window is larger than one sunshield. Further, if the shape of the window is such that the sunshield should be mounted vertically, the hinges can be attached to the tops and bottoms of the sunshields in a manner similar to that shown in FIG. 3 depicting the side-by-side sunshields.

Windows, for example in cars or trucks, may have somewhat irregular shapes, therefore a sunshield as shown in FIG. 4 is provided. Preferably sunshield 50 includes spring loop 52 attached around the outer perimeter defining the configuration of the sunshield. The sunshield has top 54 and bottom 56 and sides 58,60 to define the configuration of the sunshield. Side 60 is angled and configured to approximate windows having a similar angular shape. Sunshield 50 has a pair of hinges 62,63 for easily removably attaching a sunshield to a window as previously described. As depicted in FIGS. 4 and 5, if two sunshields are to be mounted side by side, hinges 62 and 26 are overlapped to receive a single suction cup. Like the rectangularly shaped sunshield previously described, sunshield 50 has hinge 62 containing aperture 64 which is secured by grommet 66. For clarity, FIG. 5a depicts apportion of sunshield 10 and sunshield 50 where hinges 26 and 62 are spaced apart. However, as shown in FIG. 4, hinges 26 and 62 overlap and receive a single suction cup to secure the sunshields to a window. As illustrated in FIG. 5b, hinges 26 and 62 are flexible attached with VEL-CRO at element 67. In addition, FIG. 5c illustrates that hinges 26 and 62 are removable at element 67.

In an alternative embodiment as shown in FIG. 6, a pair of sunshields are attached together, and incorporate aspects of the invention for removably attaching to a window. More specifically, first sunshield 70 is attached to second sunshield 80 by flexible connector segment 77. Similar to the previously described sunshield devices, first sunshield 70 includes top edge 71, bottom edge 72, and side edges 75,76. Generally a spring loop 73 forms a continuous loop around the periphery of sunshield 70 and is attached thereto by know means. Material 74 is stretched tightly by spring loop 73 as was previously described.

In the embodiment of FIG. 6, the second sunshield is flexibly connected by connector segment 77 to second sunshield 80. The connector segment preferably is made from material 78 which typically would be the same material forming first sunshield and the second sunshield. While preferable, material 78 can differ from the rest of the material in the connected sunshields. A seam 79 bounds the periphery of connector segment 77.

In keeping with the convention, second sunshield 80 likewise has top edge 81, bottom edge 82 and side edge 83. Material 84 is stretched tightly over spring loop 85, again as previously described.

In order to removably attach sunshields 70 and 80 to a window, hinges 90 and 91 are attached (as previously described) to sunshields 70,80. Aperture 92,93 is incorporated in the hinges for receiving suction cups as described in connection with FIG. 2. Hinges 90,91 are attached in a manner similar to that described above.

As previously described, the sunshields can be made of well known materials that screen out sun glare yet permit unobstructed visibility through the sunshield. Preferably, the hinges described herein are made of a material similar to the sunshield material, however, they can be made of any material that provides flexibility and that permits the sunshield to be easily temporarily and securely attached to a window.

Preferably the hinges can be attached in any suitable manner to the sunshields such as by sewing, stapling, use of metallic or non-metallic fasteners, gluing, or similar attachment means. It is preferred that the hinges are attached so that they have an aesthetic appearance yet securely attach the hinge to the sunshield.

In order to enhance the appearance of the sunshields of the present inventions, cartoon characters or similar displays can be printed on the sunshield material. The displays assist in screening the sun but do not impair viewing through the sunshield material.

Although specific embodiments and certain structural arrangements have been illustrated and described herein, it will be clear to those skilled in the art that various other modifications and embodiments may be made incorporating the spirit and scope of the underlying inventive concepts and that the same are not limited to the particular methods and structures herein shown and described except insofar as determined by the scope of the appended claims.

What is claimed:

1. A sunshield, comprising:
a first sunshield material and a second sunshield material each having a geometric shape including a first edge, a second edge, a top edge, and a bottom edge, wherein the geometric shape forms a pair of separate and distinct sunshields;
at least one hinge attached to at least one of the first, second, top, or bottom edges of each of the first and second sunshield material, the hinge having an opening sized for a snug fit with a suction cup;
the suction cup slidably received within the hinge opening, wherein each of the pair of sunshields may be removably attached to a window surface by means of the suction cup; and
wherein one of the at least one hinge of the first sunshield material is configured to overlay one of the at least one hinge of the second sunshield material through which a single suction cup maybe placed to attach the first and second sunshield materials to each other and to the window surface.

2. The sunshield of claim 1, wherein the at least one hinge being fitted with grommets.

3. The sunshield of claim 2 wherein, at least one hinge is removably attached to the sunshield.

4. A sunshield, comprising:
a first sunshield material and a second sunshield material each having a geometric shape including a first edge, a second edge, a top edge, and a bottom edge, wherein the geometric shape forms a pair of separate and distinct sunshields;
at least one hinge attached to at least one of the first, second, top, or bottom edges of each of the first and second sunshield material, the hinge having an opening for receipt of a grommet;
the grommet fixed within the hinge, having an opening sized for a snug fit with a suction cup;
the suction cup slidably received within the opening of the grommet, wherein each of the pair of sunshields may be removably attached to a window surface by means of the suction cup; and wherein one of the at least one hinge of the first sunshield material is configured to overlay one of the at least one hinge of the second sunshield material through which a single suction cup maybe placed to attach the first and second sunshield materials to each other and to the window surface.

5. The sunshield of claim 4 wherein, at least one hinge is removably attached to the sunshield.

6. The sunshield of claim 4, wherein at least one hinge is removably attached to the sunshield with VELCRO.

7. The sunshield of claim 4 wherein, at least one hinge is flexibly attached to the sunshield.

8. The sunshield of claim 4 wherein, at least one hinge is removably and flexibly attached to the sunshield.

9. A sunshield assembly, comprising:

a first sunshield material having a geometric shape including a first edge, a second edge, a top edge, and a bottom edge, wherein the geometric shape forms a sunshield;

a second sunshield material having a geometric shape including a first edge, a second edge, a top edge, and a bottom edge, wherein the geometric shape forms a sunshield, and wherein the first and second sunshield materials form a pair of separate and distinct sushields;

a first flexible connector segment removably connecting the first sunshield to a second flexible connector of the second sunshield;

a first hinge attached to the first sunshield, the first hinge having an opening sized for a snug fit with a first suction cup;

a second hinge attached to the second sunshield, the second hinge having an opening sized for a snug fit with a second suction cup;

the first suction cup sized for a snug fit with the first hinge, wherein the sunshield may be removably attached to a window surface by means of the first suction cup; and the second suction cup sized for a snug fit with the second hinge, wherein the sunshield may be removably attached to a window surface by means of the second suction cup.

* * * * *